United States Patent Office 3,845,146
Patented Oct. 29, 1974

---

3,845,146
BROMINATION WITH BROMINE CHLORIDE UNDER PRESSURE
Donald E. Moore, Coleman, and Jack F. Mills and John A. Schneider, Midland, Mich., assignors to The Dow Chemical Company, Midland, Mich.
No Drawing. Continuation-in-part of abandoned application Ser. No. 864,219, Oct. 6, 1969. This application Mar. 30, 1972, Ser. No. 240,297
Int. Cl. C07c 25/04
U.S. Cl. 260—650 R                   8 Claims

ABSTRACT OF THE DISCLOSURE

Benzene, lower alkylbenzene, phenol, biphenyl and diphenyl oxide are brominated with bromine chloride in the presence of iron or a Friedel-Crafts catalyst in a closed vessel under essentially autogenous pressure to obtain rapid polybromination of the aromatic nucleus.

BACKGROUND OF THE INVENTION

Britton and Tree in U.S. Pat. 2,607,802 teach the use of approximately equal molar amounts of chlorine and bromine under atmospheric pressure to add one or two bromine atoms to a benzene ring which may already contain up to three halogen atoms. Hahn in British Pat. 934,970 teaches a method of preparing hexabromobenzene by reacting bromine with benzene in the presence of fuming sulfuric acid and a Friedel-Crafts catalyst at a temperature of about 80° to 90° C. for about 9 hours. These processes are quite useful; however, the strenuous reaction conditions, long reaction times and relatively high temperatures have resulted in a search for a more convenient reaction.

This application is a continuation-in-part of co-pending application Ser. No. 864,219 filed Oct. 6, 1969, and now abandoned.

SUMMARY OF THE INVENTION

According to the present invention, benzene, lower alkylbenzene, phenol, biphenyl and diphenyl oxide are brominated with bromine chloride in the presence of iron or a Friedel-Crafts catalyst under essentially autogenous pressure to obtain rapid polybromination of the aromatic nucleus. Using bromine chloride, the reaction may suitably be conducted at about room temperature and is complete in a few hours with yields in excess of 80% generally being obtained.

The brominated compound of the present invention is generally prepared by adding the catalyst and on of the reactants to a batch reactor and then slowly adding the other reactant. Either the aromatic compound or the bromine chloride may be initially charged into the reactor along with the catalyst.

The brominatable substrate in the reaction may suitably be benzene, lower alkylbenzenes having one or two alkyl groups of 1–6 carbon atoms, phenol, biphenyl or diphenyl oxide. Of these reactants benzene, toluene and phenol are preferred, with benzene being especially preferred. The advantageous aspect of the present process is the fact that the nucleus of the aromatic reactants may be completely brominated rapidly and effectively without substantial chlorination.

The bromine chloride of the present invention may be prepared by a number of known methods. Conveniently, equal molar amounts of bromine and chlorine are mixed in a closed container and the bromine chloride thus formed is withdrawn from the liquid phase in the vessel. By employing this technique, an essentially constant mixture of bromine, bromine chloride and chlorine is obtained.

The mole ratio of bromine chloride to benzene or the substituted benzene may vary widely. Although a stoichiometric amount of bromine chloride may be reacted with the aromatic compound to give the desired product, an excess of bromine chloride is generally employed to insure short reaction periods and complete conversion. Any excess of bromine chloride may suitably be used in the present invention, with a 5 to 20% stoichiometric excess of bromine chloride being preferred.

The catalyst of the present invention is suitably iron or a Friedel-Crafts catalyst such as aluminum chloride, ferric chloride or zinc chloride. Of these catalysts, aluminum chloride and ferric chloride are preferred.

The reaction of the present invention is conducted in a closed reaction vessel under essentially autogenous pressure. As the bromine chloride reacts with the benzene or substituted benzene, hydrogen chloride is formed. Traditionally, this hydrogen chloride would be vented from the reactor to prevent the chloride from causing an interfering reaction. According to the present invention, however, the hydrogen chloride is retained in the reactor under essentially autogenous pressure. Rather than generating a substantial interfering reaction, it has been found that greater yields of the desired brominated product are rapidly obtained with little chlorinated by-product. Contrary to the expected result, the amount of chlorine in the product is generally below about 1% by weight.

Although the reaction is conducted under essentially autogenous pressure, the pressure can be relieved to a minor extent by venting during the course of reaction without detrimentally affecting the improved bromination reaction. Also, during the course of the reaction, the reactor may be pressurized by HCl or an inert gas so that the pressure of the reactor is above the autogenous pressure. Reducing the autogenous pressure to a minor degree and increasing the autogenous pressure are mere modifications of the present invention and are considered to be within the scope of the invention as covered by the use of the term "essentially autogenous pressure." Even though these modifications of the present invention may be used, running the reactor under the autogenous pressure without modification is preferred. In addition the term, closed reactor, is intended to cover the situation in which gases are periodically vented off.

The autogenous pressure encountered in the reaction vessel during the course of the reaction may vary widely. Suitably, these pressures may range from about 10 to about 200 p.s.i.g. or more, with pressures of about 50 to about 100 p.s.i.g. being preferred.

As a result of retaining the HCl in the reactor, faster reactions with higher yields are obtained without the loss of either reactant. According to present techniques, venting the HCl from the reactor would also release at least a portion of the bromine chloride in addition to the HCl. Thus, by keeping the HCl in the reactor as provided in the present invention, bromine chloride is more efficiently employed.

The temperature of the reaction is not critical. Generally, temperatures below those used for the corresponding reaction with bromine are employed. Suitably, the temperatures may range from about −10° to about 150° C. or more, with temperatures of less than 50° C. being preferred.

A solvent may be used in the reaction although good conversions and yields are obtained by using excess bromine chloride as the solvent. Suitable solvents include the halogenated hydrocarbons such as methylene chloride, chloroform, carbon tetrachloride, ethylene dichloride, methylene bromide and the like. It has also been found that excess bromine is a good solvent.

Best results in the reaction are obtained when the reactor is run under essentially anhydrous conditions. Water apparently deactivates the catalyst and causes the reaction to proceed at a much slower rate.

The reaction time required varies widely as different reactant ratios, temperatures, pressures and solvents are employed. Generally, essentially complete bromination is obtained within a few hours.

By reacting an aromatic substrate with a stoichiometric excess of bromine chloride in the presence of iron or a Friedel-Crafts catalyst under essentially autogenous pressure, high yields of brominated product and low yields of chlorinated product are obtained at lower temperatures, in shorter reaction times and with more efficient use of bromine than methods presently known to prepare highly brominated substrates.

Examples 4-6

Parallel experiments were conducted to determine the result of brominating toluene, phenol and benzene under autogenous pressure versus atmospheric pressure. One hour batch reactions were run under identical conditions at room temperature using a methylene chloride solvent to aromatic ratio by weight of about 50 to 1, an equivalent amount of BrCl or more as noted based on replacement of all aromatic hydrogens and a BrCl to aluminum chloride catalyst ratio by weight of about 25 to 1. For each substrate, two parallel runs were made: one where the reactor was capped immediately after the addition of reactants to give a pressure run and other without capping at atmospheric pressure. The results of these parallel experiments are shown in Table I.

TABLE I

[Bromination with bromine chloride under autogenous pressure]

| Example | Substrate | Amt. of BrCl | Wt. percent of brominated products | | | | Br product percent yield[2] |
|---|---|---|---|---|---|---|---|
| | | | Hexa | Penta | Tetra | Tri | |
| 4 | Toluene | Equivalent | | 56.6 | 31.8 | 9.2 | 88.3 |
| 4 atm.[1] | do | do | | 14.4 | 51.3 | 34.3 | 69.9 |
| 5 | Phenol | 10% excess | | 34.2 | 62.9 | 2.9 | 89.5 |
| 5 atm.[1] | do | do | | 5.7 | 77.5 | 16.7 | 83.3 |
| 6 | Benzene | do | 20.1 | 30.3 | 20.8 | 19.0 | 67.1 |
| 6 atm.[1] | do | do | 9.6 | 31.1 | 34 | 19.8 | 65.5 |

[1] Atmospheric pressure.
[2] Total reaction time was 1 hour at room temperature.

SPECIFIC EMBODIMENTS

Example 1

Bromine chloride was prepared by mixing equal molar amounts of bromine and chlorine in a closed container. To a 100 gallon pressure reactor 779 pounds of methylene chloride, 1.8 pounds of ferric chloride and 136 pounds of bromine chloride (an 8.7% excess) were added and the temperature was raised to 32° C. Over a period of 2½ hours, 14.2 pounds of benzene were added with cooling and the reaction temperature was maintained at 32° C. for an additional 3½ hours. After all of the benzene was added, the pressure was 79 p.s.i.g. and remained substantially constant for the duration of the reaction. After the reaction, solid products were separated from the methylene chloride and the methylene chloride was evaporated to yield 97.6 pounds of hexabromobenzene melting at 321° to 324° C. On the basis of the benzene used in the reaction, the yield of hexabromobenzene was 98%. The product contained 0.8% by weight of Cl.

Example 2

The same amounts of methylene chloride, ferric chloride and bromine chloride were charged to the 100 gallon pressure kettle of Example 1. 14.2 Pounds of benzene were added over a period of two hours at a temperature of 31° to 34° C. After the addition of the benzene, the pressure was 60 p.s.i. The reaction was conducted for a total of 16 hours, and 91 pounds of hexabromobenzene melting at 315° to 321° C. were obtained. Based on the benzene, the yield was 92.7%. Of the total product, 1.2% by weight was chlorine.

Example 3

To the 100 gallon pressure kettle of Example 1, 779 pounds of methylene chloride, 3.6 pounds of ferric chloride and 132.5 pounds of bromine chloride (a 5.9% excess) were charged and heated to a temperature of 30° C. 14.2 Pounds of benzene were added over a period of 2.6 hours and the reaction was conducted for 15.5 hours. During the reaction, some of the autogenous pressure of the reactor was released and the pressure was maintained at 14 p.s.i.g. The solids were separated and the crude product obtained from the methylene chloride layer contained 0.9% chlorine, 63.2 pounds of hexabromobenzene were recovered melting at 314° to 322° C. for a 63.8% yield based on the benzene.

In the same manner as described above, one mole of benzene may be reacted with 7.2 moles of bromine chloride in the presence of aluminum chloride. The reactor may be kept at 50° C. under autogenous pressure. Also, after all the reactants have been added, the reactor may be pressurized with HCl or nitrogen to a pressure of 150 p.s.i.g., such pressure being greater than the autogenous pressure. In the same manner as described in the examples above, one mole of benzene may be reacted with 6.5 moles of bromine chloride in the presence of iron using as a solvent three additional moles of bromine. In each case, perbromination is obtained with only a small amount of chlorination.

Also in the same manner as described by the examples above, 10 to 12 moles of bromine chloride may be reacted with biphenyl or diphenyl oxide under autogenous pressure in the presence of aluminum chloride to produce decabromobiphenyl and decabromodiphenyl oxide respectively in addition to lower polybrominated product.

Other lower alkylbenzenes such as ethylbenzene, propylbenzene, isopropylbenzene, butylbenzene, hexylbenzene and xylene may be polybrominated in a manner similar to that shown in the Examples above.

We claim:

1. In the process for polybrominating the aromatic nucleus of benzene, lower alkyl benzene, phenol, biphenyl or diphenyl oxide to an extent sufficient to render a product containing five or six bromine atoms on each aromatic ring which comprises reacting by contacting at a temperature of from —10° to 150° C. the aromatic nucleus with bromine chloride in an amount at least stoichiometric to give the desired product in the presence of iron or a Friedel-Crafts catalyst, the improvement which comprises carrying out the reaction in a closed reactor under a pressure of 10 to 200 p.s.i.g. during the course of the reaction.

2. The process of Claim 1 wherein some of the pressure formed in the bromination is released during the reaction.

3. The process of Claim 1 wherein the reactor is pressurized with HCl or N₂.

4. The process of Claim 1 wherein the pressure is 50 to 100 p.s.i.g.

5. The process of Claim 1 wherein benzene, toluene or phenol is reacted.

6. The process of Claim 6 wherein benzene is reacted.
7. The process of Claim 1 wherein all aromatic hydrogens are replaced by bromine.
8. The process of Claim 1 wherein a 5 to 20% stoichiometric excess of bromine chloride to give the desired product is reacted.

References Cited

UNITED STATES PATENTS

| | | | |
|---|---|---|---|
| 2,607,802 | 8/1952 | Britton et al. | 260—544 M |
| 3,285,965 | 11/1966 | Jenkner | 260—612 R |
| 2,022,634 | 11/1935 | Britton et al. | 260—612 R |
| 3,170,961 | 2/1965 | Britton et al. | 260—650 R |
| 3,449,443 | 6/1969 | Dietzler et al. | 260—623 H |

FOREIGN PATENTS

| | | | |
|---|---|---|---|
| 900,136 | 7/1962 | Great Britain | 260—623 H |
| 981,833 | 1/1965 | Great Britain | 260—612 |
| 1,161,547 | 1/1964 | Germany | 260—649 R |
| 1,193,510 | 5/1965 | Germany | 260—649 R |

HOWARD T. MARS, Primary Examiner

U.S. Cl. X.R.

260—612 R, 623 H, 649 D

PO-1050
(5/69)

UNITED STATES PATENT OFFICE
CERTIFICATE OF CORRECTION

Patent No. 3,845,146      Dated October 29, 1974

Inventor(s) D.E. Moore, J.F. Mills and J.A. Schneider

It is certified that error appears in the above-identified patent and that said Letters Patent are hereby corrected as shown below:

Column 1, line 51, delete "on" and insert --one--.

Column 4, line 13, delete "other" and insert --another--.

Column 4, first line of Table I, delete "bormine" and insert --bromine--.

Column 5, line 1, delete "Claim 6" and insert --Claim 5--.

Signed and sealed this 4th day of March 1975.

(SEAL)
Attest:

RUTH C. MASON
Attesting Officer

C. MARSHALL DANN
Commissioner of Patents
and Trademarks